United States Patent
Choi et al.

(10) Patent No.: US 12,038,269 B2
(45) Date of Patent: Jul. 16, 2024

(54) APPARATUS AND METHOD FOR MEASURING THICKNESS OF UNIT CELL

(71) Applicant: LG ENERGY SOLUTION, LTD., Seoul (KR)

(72) Inventors: Min Jun Choi, Daejeon (KR); Hyun Tae Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 270 days.

(21) Appl. No.: 17/625,967

(22) PCT Filed: Aug. 12, 2020

(86) PCT No.: PCT/KR2020/010643
§ 371 (c)(1),
(2) Date: Jan. 10, 2022

(87) PCT Pub. No.: WO2021/040277
PCT Pub. Date: Mar. 4, 2021

(65) Prior Publication Data
US 2022/0244040 A1 Aug. 4, 2022

(30) Foreign Application Priority Data
Aug. 27, 2019 (KR) .......................... 10-2019-0105416

(51) Int. Cl.
*G01B 11/06* (2006.01)
*G01B 11/02* (2006.01)

(52) U.S. Cl.
CPC ........ *G01B 11/0691* (2013.01); *G01B 11/026* (2013.01)

(58) Field of Classification Search
CPC ........ G01B 7/24; G01B 11/043; G01B 11/06; G01B 21/08; G01B 21/16; G01B 11/022;
(Continued)

(56) References Cited

U.S. PATENT DOCUMENTS

| | | | | |
|---|---|---|---|---|
| 8,654,353 B2 * | 2/2014 | Kuo | ...................... | G01B 11/245 356/602 |
| 8,893,942 B2 * | 11/2014 | Oh | ...................... | H01M 10/0409 226/19 |

(Continued)

FOREIGN PATENT DOCUMENTS

| | | | |
|---|---|---|---|
| CN | 101308017 A | 11/2008 | |
| CN | 101588797 A | 10/2009 | |

(Continued)

OTHER PUBLICATIONS

Extended European Search Report dated Jul. 22, 2022 for Application No. 20858695.8.
(Continued)

*Primary Examiner* — Michael P Stafira
(74) *Attorney, Agent, or Firm* — Birch, Stewart, Kolasch & Birch, LLP

(57) ABSTRACT

Discussed are an apparatus for measuring a thickness of a unit cell of a battery, and a method of measuring the thickness of the unit cell of the battery. The apparatus includes a plurality of transfer rollers configured to sequentially transfer unit cells, and disposed to be the plurality of transfer rollers being spaced a predetermined distance from each other; and a thickness sensor disposed at a fixed position to irradiate light to a moving path of the unit cells and calculate a time when receiving taken to receive the light that is reflected light from the unit cells, thereby measuring a thickness of each of the unit cells.

11 Claims, 4 Drawing Sheets

(58) Field of Classification Search
CPC ............ G01B 11/0691; G01B 2210/44; G01B 2210/50; G01B 7/02; G01B 7/16; G01B 11/026; G01B 7/06; G01B 7/10; G01B 11/046; G01B 21/06; G01B 5/06
See application file for complete search history.

(56) References Cited

U.S. PATENT DOCUMENTS

| | | | |
|---|---|---|---|
| 2010/0033735 | A1 | 2/2010 | Sakai et al. |
| 2013/0215419 | A1* | 8/2013 | Kuo .................. G02F 1/1309 356/237.2 |
| 2016/0252343 | A1 | 9/2016 | Fuellmeier et al. |
| 2017/0074634 | A1 | 3/2017 | Yoon et al. |
| 2018/0120095 | A1* | 5/2018 | Zhou .................. G01B 11/0691 |
| 2018/0135968 | A1 | 5/2018 | Glickman et al. |
| 2019/0383946 | A1 | 12/2019 | Namba |

FOREIGN PATENT DOCUMENTS

| | | | | |
|---|---|---|---|---|
| CN | 204523791 | U | * | 8/2015 |
| CN | 105705905 | A | | 6/2016 |
| CN | 108981587 | A | | 12/2018 |
| CN | 109520434 | A | * | 3/2019 ........... G01B 11/026 |
| CN | 110188403 | A | | 8/2019 |
| DE | 102016113717 | A1 | | 2/2018 |
| JP | 2001-264023 | A | | 9/2001 |
| JP | 2005-30921 | A | | 2/2005 |
| JP | 2007-205791 | A | | 8/2007 |
| JP | 2007-263818 | A | | 10/2007 |
| JP | 5013730 | B2 | | 8/2012 |
| JP | 2016-206170 | A | | 12/2016 |
| JP | 2016-225119 | A | | 12/2016 |
| JP | 10-2017-0103341 | A | | 9/2017 |
| JP | 6352014 | B2 | | 7/2018 |
| KR | 10-2006-0049934 | A | | 5/2006 |
| KR | 20100117915 | A | * | 11/2010 |
| KR | 10-2013-0027297 | A | | 3/2013 |
| KR | 10-2013-0139490 | A | | 12/2013 |
| KR | 10-2015-0026172 | A | | 3/2015 |
| KR | 10-2015-0033269 | A | | 4/2015 |
| KR | 10-2015-0061825 | A | | 6/2015 |
| KR | 10-2016-0008879 | A | | 1/2016 |
| KR | 101605004 | B1 | * | 3/2016 |
| KR | 10-2016-0063278 | A | | 6/2016 |
| KR | 10-2016-0122417 | A | | 10/2016 |
| KR | 10-2017-0021067 | A | | 2/2017 |
| KR | 10-2017-0041538 | A | | 4/2017 |
| KR | 20170103341 | A | * | 9/2017 |
| KR | 101884805 | B1 | * | 8/2018 |
| KR | 10-1990863 | B1 | | 6/2019 |
| KR | 10-1999170 | B1 | | 7/2019 |
| KR | 10-2010068 | B1 | | 8/2019 |
| WO | WO-2013005897 | A1 | * | 1/2013 ........ H01M 10/0404 |

OTHER PUBLICATIONS

International Search Report for PCT/KR2020/010643 mailed on Oct. 15, 2020.

* cited by examiner

APPARATUS AND METHOD FOR MEASURING THICKNESS OF UNIT CELL

CROSS-REFERENCE TO RELATED APPLICATION

The present application claims the benefit of the priority of Korean Patent Application No. 10-2019-0105416, filed on Aug. 27, 2019, the disclosure of which is hereby incorporated by reference in its entirety.

TECHNICAL FIELD

The present invention relates to an apparatus and method for measuring a thickness of a unit cell, and more specifically, to an apparatus and method for measuring a thickness of a unit cell, in which light is emitted to measure a thickness in real time while a unit cell is transferred.

BACKGROUND ART

Demands of high-efficiency secondary batteries are rapidly increasing in a field of a mobile device, an electric vehicle, or the like. However, among the secondary batteries, lithium secondary batteries having high energy density and low self-discharge characteristics and capable of maintaining relatively high voltage have been commercialized and widely used, and researches and developments for improving performances of the lithium secondary batteries have been actively conducted.

The secondary batteries have a structure in which an electrode assembly and an electrolyte are embedded within a case such as a can and a pouch. The electrode assembly has a structure in which a positive electrode, a separator, and a negative electrode are repeatedly stacked, and electrode assemblies are generally classified into a jelly-roll-type and a stacked type. In the jelly-roll-type, positive electrodes, separators, and negative electrodes are stacked and rolled, and then embedded within a case. In the stacked type, positive electrodes, separators, and negative electrodes are cut into a certain size and stacked.

The jelly-roll-type electrode assembly has a spirally wound structure and is suitable to be mounted to a cylindrical battery but has a disadvantage in space utilization for a prismatic or pouch type battery. On the contrary, the stacked type electrode assembly is adjustable in size when an electrode and a separator are cut, and thus, a prismatic shape suitable for a case is easily obtained. However, the stacked type electrode assembly is complicated to manufacture and relatively vulnerable to an external impact.

Also, a stack and folding process has been developed to combine advantages of the jelly-roll-type and the stacked type. In the stack and folding process, a bi-cell (having a stack structure of positive electrode/separator/negative electrode, in which an electrode stacked on the uppermost end is the same as an electrode staked on the lowermost end) and/or a half-cell (having a stack structure of positive electrode/separator/negative electrode, in which an electrode stacked on the uppermost end is different from an electrode staked on the lowermost end) are manufactured as unit cells having an appropriate size. Then, the unit cells are arranged spaced apart from each other on a folding separator, and the folding separator is folded to manufacture an electrode assembly.

The electrode assembly manufactured by the stack and folding process has advantages in high stability and space utilization. However, in a case where the unit cell is slightly misaligned or damaged when the unit cell is placed on the folding separator, the possibility of occurrence of defects in the electrode assembly increase.

Particularly, even one of the unit cells stacked in the electrode assembly has a defect, the entire electrode assembly is defective. Thus, before the unit cells are placed on the folding separator, it was necessary to select or identify a defective unit cell.

Here, after a laminating process of bonding electrodes and separator stacked when the unit cell is manufactured, it may be predicted from thickness measurement about whether an abnormality has occurred in the stacked electrode or whether the electrode or the separator has been folded when stacked.

However, according to the related art, after a sample of a unit cell is collected, a thickness is measured through a measurement device. However, there is a difficulty in selecting only a defective product by this sample inspection method. Also, since the laminating process has a fast production speed, it is difficult to apply a measurement method according to the related art in which a thickness is measured by physical contact.

Thus, a measurement apparatus and a measurement method have been required, which may rapidly measure thicknesses of individual unit cells while the unit cells move to a subsequent process after the laminating process.

DISCLOSURE OF THE INVENTION

Technical Problem

Therefore, to satisfy technical requirements described above, a main object of the present invention is to provide an apparatus and method for measuring a thickness of a unit cell, in which thicknesses of unit cells may be continuously measured without physical contact.

Technical Solution

In order to achieve the object described above, the present invention provides an apparatus and method for measuring thicknesses of unit cells in real time while the unit cells move continuously.

A method for measuring a thickness of a unit cell according to the present invention comprises: a unit cell transferring step (S1) of transferring unit cells through a plurality of transfer rollers which are spaced a predetermined distance from each other; a distance measuring step (S2) of irradiating light to a top surface of the unit cell through an upper thickness sensor and irradiating light to a bottom surface of the unit cell through a lower thickness sensor to calculate a time when receiving the reflected light, thereby measuring a distance between the upper thickness sensor and the top surface of the unit cell and a distance between the lower thickness sensor and the bottom surface of the unit cell; and a thickness calculating step (S3) of subtracting a measured value of the distance between the upper thickness sensor and the top surface of the unit cell and a measured value of the distance between the lower thickness sensor and the bottom surface of the unit cell from a distance between the upper thickness sensor and the lower thickness sensor to calculate the thickness of the unit cell.

Each of the upper thickness sensor and the lower thickness sensor performs the measurement at least two or more points from one end to the other end of the unit cell to measure a change in thickness while the unit cell moves.

Also, each of the upper thickness sensor and the lower thickness sensor may irradiate the light continuously even while the neighboring unit cells pass therethrough to measure a time while the light is not reflected, thereby measuring a distance between the neighboring unit cells.

In addition, an apparatus capable of measuring a thickness of a unit cell through the method described above comprises: a plurality of transfer rollers configured to sequentially transfer unit cells and disposed to be spaced a predetermined distance from each other; and a thickness sensor disposed at a fixed position to irradiate light to a moving path of the unit cells and calculate a time when receiving the reflected light, thereby measuring a thickness of each of the unit cells.

The thickness sensor comprises: an upper thickness sensor disposed above the transfer rollers to irradiate the light onto a top surface of the unit cell passing between the transfer rollers and calculate a time when receiving the reflected light, thereby measuring a distance from the unit cell; and a lower thickness sensor disposed below the transfer rollers to irradiate the light onto a bottom surface of the unit cell between the transfer rollers that are adjacent to each other and calculate a time when receiving the reflected light, thereby measuring a distance from the unit cell; and a controller configured to receive a value measured by the upper thickness sensor and a value measured by the lower thickness sensor to calculate the thickness of the unit cell.

The controller calculates the thickness of the unit cell by subtracting a sum of the distance between the upper thickness sensor and the top surface of the unit cell and the distance between the lower thickness sensor and the bottom surface of the unit cell from a distance between the upper thickness sensor and the lower thickness sensor.

The upper thickness sensor and the lower thickness sensor are vertically disposed to be perpendicular to a direction in which the transfer rollers are arranged. Thus, each of the upper thickness sensor and the lower thickness sensor may measure thicknesses individually at least two or more points from one end to the other end of the unit cell to continuously measure a change in thickness while the unit cell moves.

In addition, each of the upper thickness sensor and the lower thickness sensor may irradiate the light continuously (or a plurality of times repeatedly within a short prided of time) while the neighboring unit cells pass therethrough.

Here, the thickness measurement apparatus of the present invention may further comprise a vision device which is disposed at a fixed position to be spaced a predetermined distance from the thickness sensor and optically identifies a form and shape of the unit cell.

Advantageous Effects

In the present invention having the structure described above, the thicknesses of the individual unit cells may be measured in real time while the unit cell moves, and thus, defective unit cells may be sorted out. Accordingly, a failure rate of the electrode assembly in which the unit cells are stacked may be reduced.

Also, in the present invention, the change in thickness may be measured over the entire length of the unit cell while the unit cell moves, and thus, the defective unit cell may be identified rapidly.

Also, in the present invention, the distance between the neighboring unit cells may be identified in real time, and thus, the process of placing the subsequent unit cell may be performed more efficiently and rapidly.

In the apparatus and method of the present invention, the irradiation of light is used to measure the thickness of the unit cell, and thus, the thickness may be highly accurately measured without being affected by external factors such as heat and moisture.

MODE FOR CARRYING OUT THE INVENTION

Hereinafter, the present invention will be described in detail with reference to the accompanying drawings so that the present invention can be easily carried out by a person skill in the art to which the present invention pertains. However, the present invention may be embodied in several different forms, and not be limited to the embodiments set forth herein.

A part unrelated to the description will be omitted so as to clearly describe the present invention, and the same reference symbols are affixed to identical or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to an apparatus and method for measuring thicknesses of unit cells in real time while the unit cells move continuously. Hereinafter, embodiments of the present invention will be described in more detail with reference to the accompanying drawings.

First Embodiment

Figure 1:
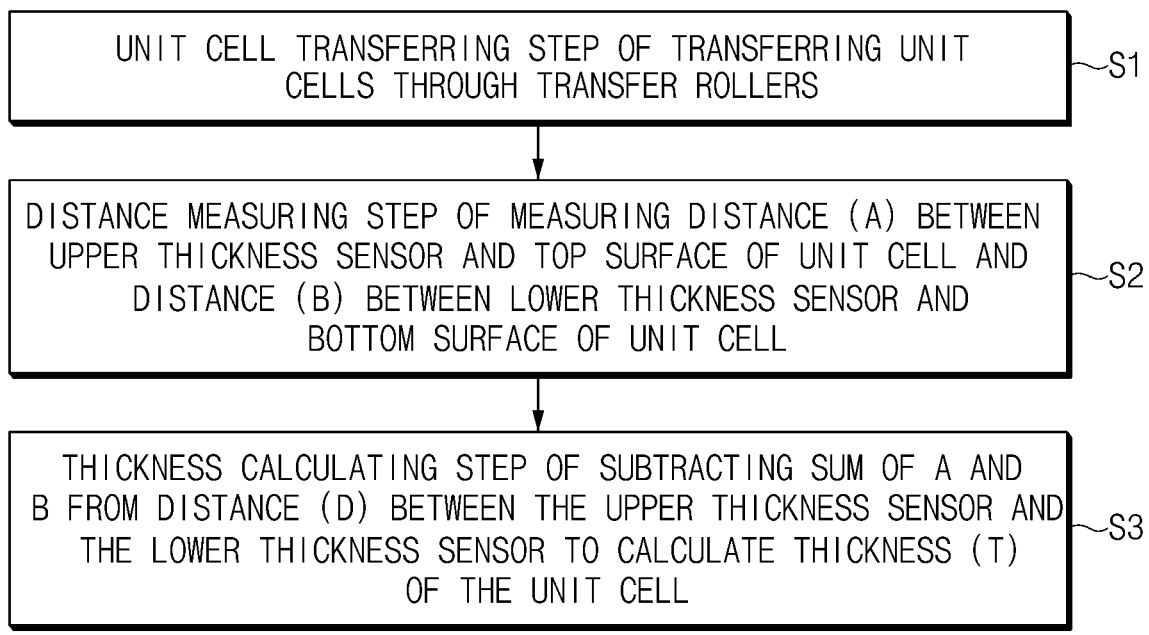
FIG. 1 is a flow chart illustrating a sequence of a method for measuring a thickness according to a first embodiment of the present invention.

In the present invention, a method for measuring a thickness of a unit cell 10 is provided as a first embodiment. As shown in FIG. 1 that illustrates a sequence of the method for measuring a thickness according to the first embodiment of the present invention, the measurement method of the present invention is provided in that a change in distance from a fixed position to the unit cell 10 is measured to measure a thickness of the unit cell 10 while the unit cell 10 is transferred.

Figure 2:
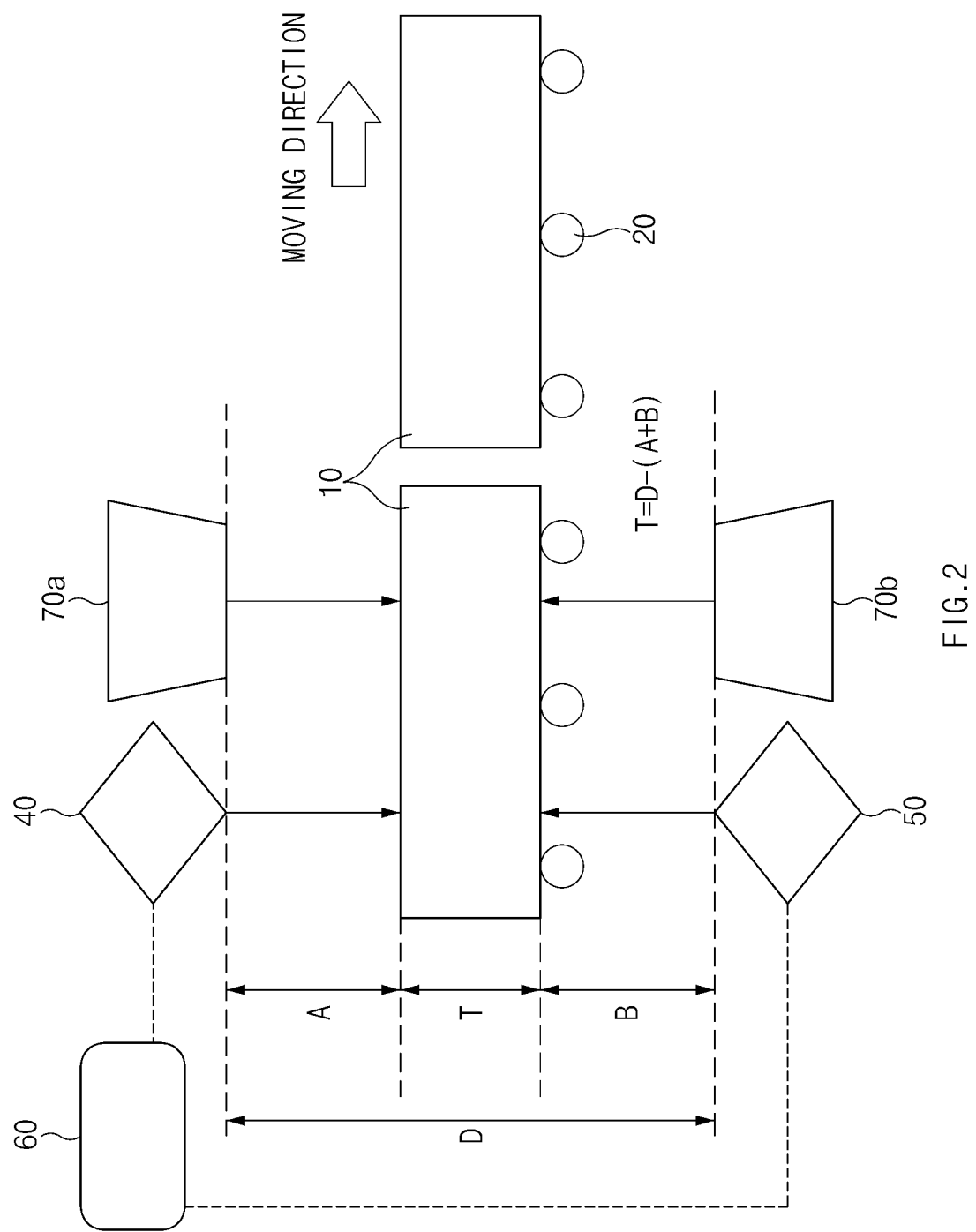
FIG. 2 is a schematic view of an apparatus for measuring a thickness according to a second embodiment of the present invention.

With reference to FIG. 2 in which a thickness measurement apparatus of the present invention is schematically illustrated, the thickness measurement of the unit cell 10 of the present invention is described. When unit cells 10 are transferred through transfer rollers 20 disposed side by side spaced a predetermined distance from each other, the light is irradiated from the upper side and the lower side of each of the unit cells 10 to the top surface and the bottom surface of the unit cell 10, and a movement time of the reflected light is measured to measure the thickness.

More specifically, the embodiment comprises a unit cell transferring step or operation (S1), a distance measuring step or operation (S2), and a thickness calculating step or operation (S3).

During the unit cell transferring step (S1), the plurality of transfer rollers 20 rotate, while being arranged side by side, and continuously transfer the unit cells 10 from a previous production process to a subsequent production process at a constant speed (or getting slower or faster). Here, the unit cells 10 are disposed to move while being spaced a predetermined distance from each other. The transfer rollers 20 have the same size and are spaced an appropriate distance from each other so that the vertical movement of the unit cells 10 are suppressed while moving, and the transfer rollers 20 are configured such that rotation speed is controllable individually or entirely at the same time.

Also, an upper thickness sensor 40 and a lower thickness sensor 50 are disposed on an upper side and a lower side, respectively, at one point between the transfer rollers 20. Each of the upper thickness sensor 40 and the lower thickness sensor 30 comprises a light emitting part for irradiating light and a light receiving part for receiving the light that is irradiated from the light receiving part and reflected, and may be configured to measure a difference between a time for irradiating the light and a time for receiving the light. Here, the lower thickness sensor 50 is positioned to emit and receive the light between the transfer rollers 20, and the upper thickness sensor 40 is disposed right above the lower thickness sensor 50 in a vertical direction.

Thus, during the distance measuring step (S2), the light emitting part of the upper thickness sensor 40 irradiates light to the top surface of the unit cell 10, and then a time taken to receive the light is calculated to measure a distance A between the upper thickness sensor 40 and the top surface of the unit cell 10. Also, the light emitting part of the lower thickness sensor 50 irradiates light to the bottom surface of the unit cell 10, and then a time taken to receive the light is calculated to measure a distance B between the lower thickness sensor 50 and the bottom surface of the unit cell 10.

Also, the distance values A and B measured by the upper thickness sensor 40 and the lower thickness sensor 50 are transmitted to a controller 60. In the controller 60 of the thickness calculating step (S3), the thickness T of the unit cell 10 is calculated by subtracting, from a distance D between the upper thickness sensor 40 and the lower thickness sensor 50, a measurement value of a distance A between the upper thickness sensor 40 and the top surface of the unit cell 10 and a measurement value of a distance B between the lower thickness sensor 50 and the bottom surface of the unit cell 10.

Here, while the unit cell 10, of which a thickness is measured, passes between the upper thickness sensor 40 and the lower thickness sensor 50, the distance measuring step (S2) and the thickness calculating step (S3) may be repeated a plurality of times from a moment when the unit cell 10 enters between the upper thickness sensor 40 and the lower thickness sensor 50 to a moment when the unit cell 10 exits therefrom. Thus, a change in thickness of the unit cell 10 may be measured.

Figure 3:
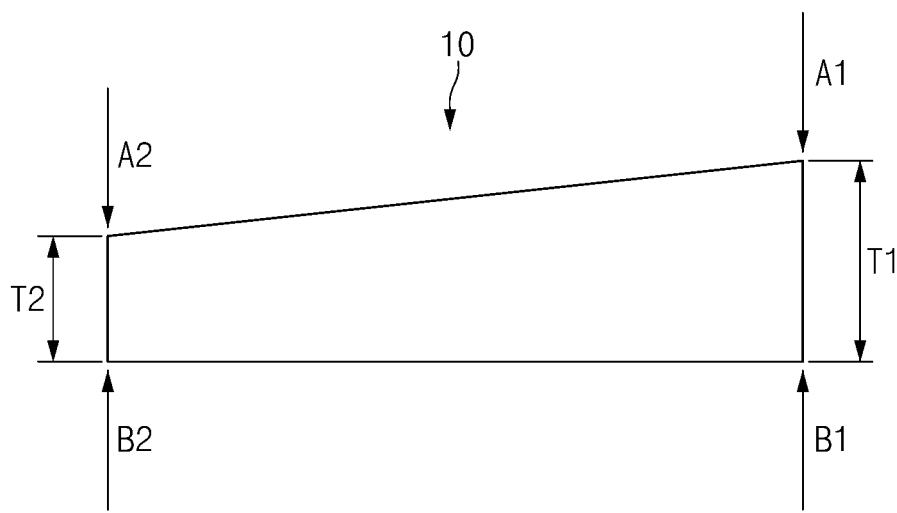
FIG. 3 is a side view illustrating a side surface of a unit cell of which both ends have different thicknesses.

That is, as illustrated in FIG. 3 illustrating a side view of a unit cell 10 of which both ends have different thicknesses, when a defect occurs in an electrode or a separator stacked in the unit cell 10 during a previous manufacturing process or when folding failure occurs upon being stacked, the thicknesses of the unit cell 10 on both sides may not be uniform.

Here, in the present invention, while the unit cell 10 passes between the upper thickness sensor 40 and the lower thickness sensor 5, the thickness may be measured individually at at least two points spaced apart from each other to determine whether the failure occurs.

For example, when A1 and B1 are measured at a specific point and a thickness is calculated as T1, and A2 and B2 are measured at another point and a thickness is calculated as T2, it may be determined that the flatness of the unit cell 10 is poor as illustrated in FIG. 3. The unit cell 10 having such a defect may be removed from the transfer rollers 20 before reaching destination.

When the number of measurement points is increased while the unit cell 10 passes, the change in thickness of the unit cell 10 may be more precisely found. Thus, in the measurement method of the present invention, each of the upper thickness sensor 40 and the lower thickness sensor 40 irradiates and receives light continuously and repeatedly while the unit cell 10 moves, and thus, the change in thickness from one end to the other end of the unit cell 10 may be measured in real time.

Also, each of the upper thickness sensor 40 and the lower thickness sensor 50 may continuously irradiate light until a next unit cell 10 arrives after the unit cell 10 of which the thickness is measured passes, that is, while neighboring unit cells 10 pass. Here, since the irradiated light is not reflected by the unit cells 10, the light is not received. Thus, a time while the light is not reflected may be measured to calculate a distance between the neighboring unit cells 10.

Figure 4:
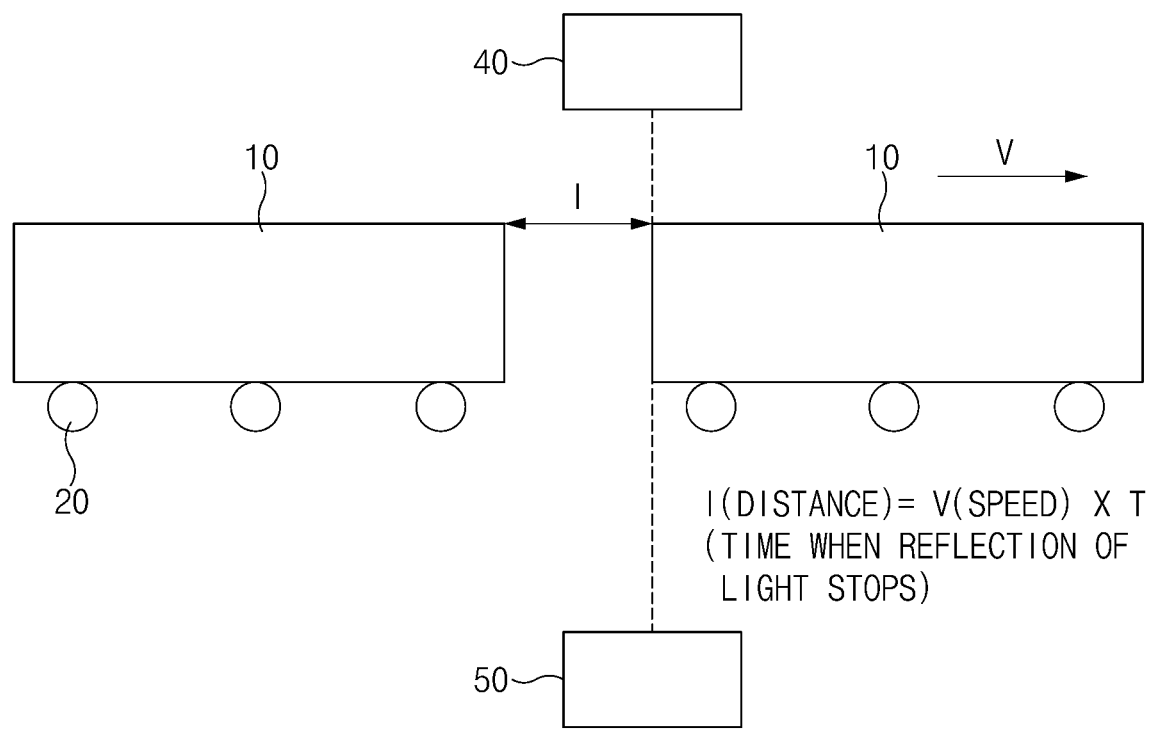
FIG. 4 is a view illustrating a distance I between neighboring unit cells while moving the neighboring unit cells.

That is, as shown in FIG. 4 illustrating a distance I between neighboring unit cells while moving, each of the upper thickness sensor 40 and the lower thickness sensor 50 may detect departure of the unit cell 10 at a moment light reception ends after the light is emitted and may detect arrival of a next unit cell 10 when the light is received again. Here, a moving speed V of the unit cell according to a rotation speed of the transfer roller 20 is a constant value, and thus, when a time T while light reflection (light reception) stops is measured, a distance I between the neighboring unit cells 10 may be calculated by I=V×T.

For reference, the lower thickness sensor 50 may receive the light emitted from the upper thickness sensor 40 and recognize it as that the unit cell 10 passes. To prevent the above phenomenon, each of the upper thickness sensor 40 and the lower thickness sensor 50 may emit and receive light having different characteristics (for example, light having different wavelengths). It is desirable to be configured such that light having different characteristics may not be received or configured to be able to determine whether the light is reflected light.

Second Embodiment

Also, in the present invention, a thickness measurement apparatus for a unit cell 10, which may measure a thickness of the unit cell 10 through the measurement method according to the first embodiment, is provided as a second embodiment.

In the embodiment, the thickness measurement apparatus comprises a plurality of feed rollers 20 that sequentially transfer unit cells 10 and are spaced a distance from each other and a thickness sensor disposed at a fixed position to irradiate light to a moving path of the unit cells 10 and calculate a time when receiving the reflected light, thereby measuring a thickness of each of the unit cells 10.

The thickness sensor comprises: an upper thickness sensor 40 disposed above the transfer rollers 20 to irradiate the light onto a top surface of the unit cell 10 passing between the transfer rollers 20 and calculate a time when receiving the reflected light, thereby measuring a distance from the unit cell 10; and a lower thickness sensor 50 disposed below the transfer rollers 20 to irradiate the light onto a bottom surface of the unit cell 10 between the transfer rollers 20 that are adjacent to each other and calculate a time when receiving the reflected light, thereby measuring a distance from the unit cell 10. Also, the thickness sensor comprises a controller 60 that receives a value measured by the upper thickness sensor 40 and a value measured by the lower thickness sensor 50 to calculate the thickness of the unit cell 10.

The controller 60 is configured to transmit and receive data to and from the upper thickness sensor 40 and the lower thickness sensor 50, and may control operations (a light emitting period, light intensity adjustment, and the like) of the upper thickness sensor 40 and the lower thickness sensor 50. The controller 60 may calculate a thickness T of the unit cell by subtracting a sum (A+B) of a distance A between the upper thickness sensor 40 and the top surface of the unit cell 10 and a distance B between the lower thickness sensor 50 and the bottom surface of the unit cell 10 from a distance D between the upper thickness sensor 40 and the lower thickness sensor 50 (i.e., T=D−(A+B)).

Here, the upper thickness sensor 40 and the lower thickness sensor 50 are vertically disposed to be perpendicular to a direction in which the transfer rollers 20 are arranged, and thus, each of the upper thickness sensor 40 and the lower thickness sensor 50 may perform measurement above or below a specific point of the unit cell 10 while the unit cell 10 moves.

The upper thickness sensor 40 and the lower thickness sensor 50 may measure thicknesses at several points by irradiating and receiving light several times not one time while the unit cell 10 passes. Accordingly, a change in thickness from one to the other end of the unit cell 10 may further precisely measured.

In addition, while neighboring unit cells 10 pass, each of the upper thickness sensor 40 and the lower thickness sensor 50 may irradiate the light continuously or repeatedly within a short period of time to measure a distance between the neighboring unit cells 10.

Here, the thickness measurement apparatus of the present invention may further comprise vision devices 70a and 70b which are disposed at fixed positions to be spaced a predetermined distance from the thickness sensor and optically identify a form and shape of the unit cell 10.

The vision devices 70a and 70b are disposed above and below the transfer roller 20, respectively, to optically detect an angle and orientation at which the unit cell 10 is placed on the transfer rollers 20, and provide information so that the orientation and angle of the unit cell is corrected by other correcting devices before transferred to a next process through the transfer rollers 20.

In the present invention having the structure described above, the thicknesses of the individual unit cells 10 may be measured in real time while the unit cells move, and thus, a failure rate of the electrode assembly manufactured by stacking the unit cells 10 may be reduced.

In addition, in the present invention, the change in thickness may be measured over the entire length of the unit cell 10 while the unit cell 10 moves, and thus, the defective unit cell 10 may be identified rapidly.

Also, in the present invention, the distance between the neighboring unit cells 10 may be identified in real time, and thus, the process of placing the subsequent unit cells 10 may be performed more efficiently and rapidly.

In the apparatus and method of the present invention, the irradiation of light is used to measure the thickness of the unit cell 10, and thus, the thickness may be highly accurately measured without being affected by external factors such as heat and moisture.

Although the present invention is described by specific embodiments and drawings, the present invention is not limited thereto, and various changes and modifications may be made by a person skilled in the art to which the present invention pertains within the technical idea of the present invention and equivalent scope of the appended claims.

DESCRIPTION OF THE SYMBOLS

10: unit cell
20: transfer rollers
40: upper thickness sensor
50: lower thickness sensor
60: controller
70a, 70b: vision device

The invention claimed is:

1. An apparatus for measuring a thickness of a unit cell, the apparatus comprising:
a plurality of transfer rollers configured to sequentially transfer unit cells, the plurality of transfer rollers being spaced a predetermined distance from each other; and
a thickness sensor disposed at a fixed position to irradiate light to a moving path of the unit cells and calculate a time taken to receive the light that is reflected from the unit cells, thereby measuring a thickness of each of the unit cells,
wherein the thickness sensor comprises:
an upper thickness sensor disposed above the plurality of transfer rollers to irradiate the light onto a top surface of a unit cell of the unit cells passing between the plurality of transfer rollers and calculate a first time taken to receive the reflected light, thereby measuring a first distance from the unit cell; and
a lower thickness sensor disposed below the plurality of transfer rollers to irradiate the light onto a bottom surface of the unit cell passing between the plurality of transfer rollers that are adjacent to each other and calculate a second time taken to receive the reflected light, thereby measuring a second distance from the unit cell; and
a controller configured to receive a value of the first distance measured by the upper thickness sensor and a value of the second distance measured by the lower thickness sensor to calculate the thickness of the unit cell, and
wherein each of the upper thickness sensor and the lower thickness sensor irradiates the respective light continuously while neighboring unit cells pass therethrough so that the respective light is irradiate into a gap between the neighboring unit cells.

2. The apparatus of claim 1, wherein the controller calculates the thickness of the unit cell by subtracting a sum of the first distance between the upper thickness sensor and the top surface of the unit cell and the second distance between the lower thickness sensor and the bottom surface of the unit cell from a distance between the upper thickness sensor and the lower thickness sensor.

3. The apparatus of claim 2, wherein the upper thickness sensor and the lower thickness sensor are vertically disposed to be perpendicular to a direction in which the plurality of transfer rollers are arranged.

4. The apparatus of claim 1, wherein each of the upper thickness sensor and the lower thickness sensor performs the distance measurement at least two or more points from one end to the other end of the unit cell to measure a change in the thickness of the unit cell while the unit cell moves.

5. The apparatus of claim 1, further comprising a vision device which is disposed at a fixed position to be spaced a predetermined distance from the thickness sensor and optically identifies a form and shape of the unit cell.

6. A method for measuring a thickness of a unit cell, the method comprising:
- a unit cell transferring operation of transferring unit cells through a plurality of transfer rollers which are spaced a predetermined distance from each other;
- a distance measuring operation of irradiating light to a top surface of a unit cell of the unit cells through an upper thickness sensor and irradiating light to a bottom surface of the unit cell through a lower thickness sensor to calculate a time taken to receive the respective light reflected from the unit cell, thereby measuring a first distance between the upper thickness sensor and the top surface of the unit cell and a second distance between the lower thickness sensor and the bottom surface of the unit cell; and
- a thickness calculating operation of subtracting a measured value of the first distance between the upper thickness sensor and the top surface of the unit cell and a measured value of the second distance between the lower thickness sensor and the bottom surface of the unit cell from a distance between the upper thickness sensor and the lower thickness sensor to calculate the thickness of the unit cell, wherein each of the upper thickness sensor and the lower thickness sensor irradiates the respective light continuously even while neighboring unit cells pass therethrough so that respective light is irradiate into a gap between the neighboring unit cells.

7. The method of claim 6, wherein each of the upper thickness sensor and the lower thickness sensor performs the measurement at least two or more points from one end to the other end of the unit cell to measure a change in the thickness of the unit cell while the unit cell moves.

8. The method of claim 7, wherein a time when the respective light is irradiated into the gap between the neighboring unit cells and not reflected is used to calculate a distance between the neighboring unit cells.

9. The method of claim 6, wherein the light irradiated by the upper thickness sensor and the light irradiated by the lower thickness sensor have different characteristics.

10. The apparatus of claim 1, wherein a time when the respective light is irradiated into the gap between the neighboring unit cells and not reflected by the neighboring unit cells is used to calculate a distance between the neighboring unit cells.

11. The apparatus of claim 1, wherein the light irradiated by the upper thickness sensor and the light irradiated by the lower thickness sensor have different characteristics.

* * * * *